Dec. 5, 1961   F. GRÄTZ ET AL   3,011,939
PROCESS AND DEVICE FOR INTRODUCING AND REMOVING A CYLINDER
MOULD IN MACHINES FOR THE MANUFACTURE OF
PAPER, CARDBOARD OR THE LIKE
Filed Jan. 27, 1958   3 Sheets-Sheet 1

INVENTORS:

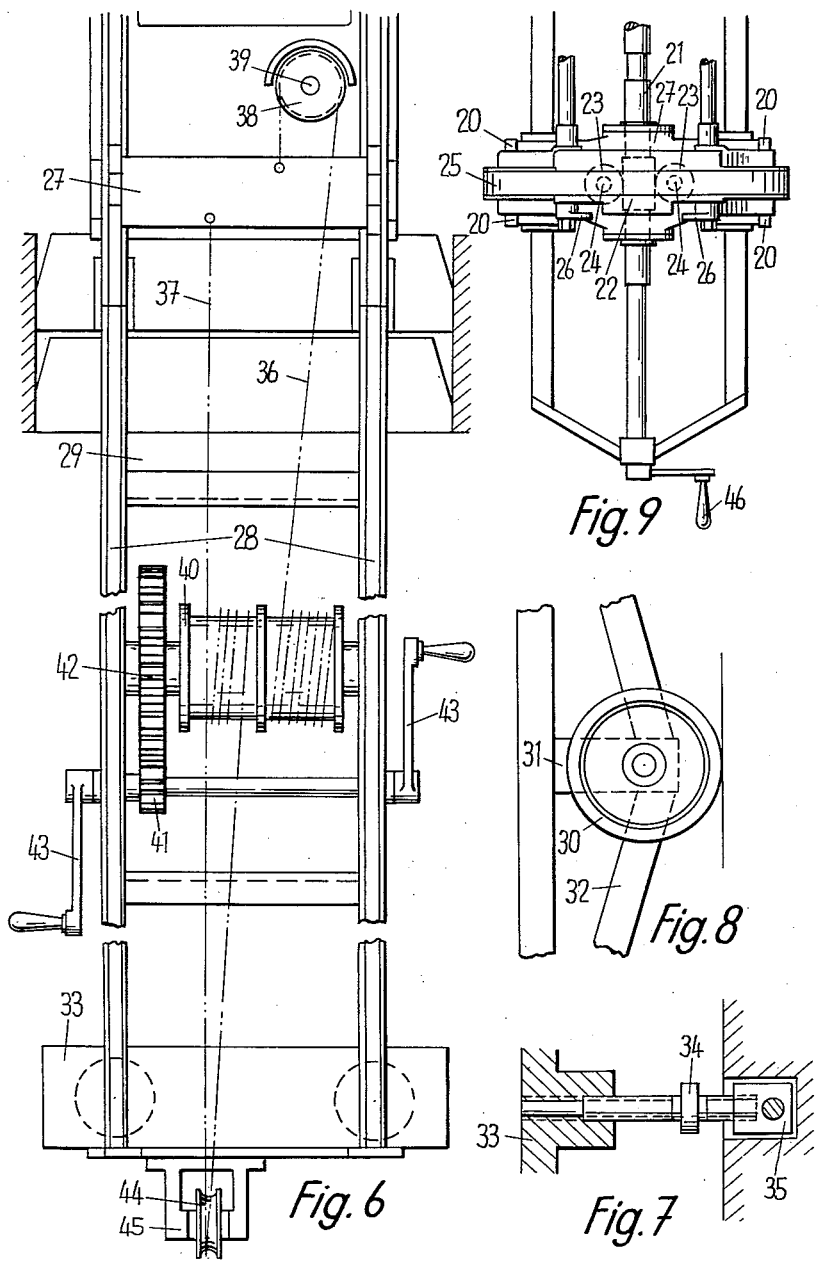

United States Patent Office 3,011,939
Patented Dec. 5, 1961

3,011,939
PROCESS AND DEVICE FOR INTRODUCING AND REMOVING A CYLINDER MOULD IN MACHINES FOR THE MANUFACTURE OF PAPER, CARDBOARD OR THE LIKE
Fritz Grätz and Josef Kratz, Duren, Rhineland, Germany, assignors to O. Dorries A.G., Duren, Rhineland, Germany
Filed Jan. 27, 1958, Ser. No. 711,323
Claims priority, application Germany May 11, 1957
1 Claim. (Cl. 162—200)

The invention relates to a process and a device for introducing and removing a cylinder mould in machines for the manufacture of paper, cardboard or the like, the machine being of the type which is provided with a cylinder mould which revolves in a cylinder vat and take-up felt which, in operation, is held in contact with the cylinder mould by a couching roll.

In machines of this type, it is from time to time necessary to effect repairs, cleaning and other work on the cylinder moulds, or to change the wire cloth of which the cylinder portions of the cylinder moulds consist.

According to a known process, this is done by stopping the machine, removing the couching roll, removing the take-up felt from the cylinder mould, and then moving the cylinder mould and the cylinder vat in and out laterally together. In order to minimize loss of production while performing this operation, the necessary work is usually carried out on week-ends, on Sundays or holidays. This results in an increase in costs. Furthermore, during normal use damage often occurs to the cylinder moulds which must be repaired immediately, thus making stoppage of the machine unavoidable.

The present invention provides an apparatus whereby interruption in the operation of the paper-making machine can be completely overcome in the case of machines having a plurality of cylinder moulds, and can be reduced to a minimum in the case of machines having only one cylinder mould.

According to the invention there is provided an apparatus for making paper and paper-like materials comprising a cylinder vat and a cylinder mould removably mounted in the cylinder, a take-up felt movable into and out of contact with the cylinder mould, a couching roll mounted adjacent said cylinder mould, means for moving the couching roll between a position in which the take-up felt is held in contact with the cylinder mould and another position in which the take-up felt is spaced apart from the cylinder mould, a felt-supporting roller mounted adjacent the cylinder mould and means for moving the felt-supporting roller between a position in which it contacts the take-up felt and another position in which it is spaced from said felt.

In a preferred embodiment of the invention the felt-supporting roller is mounted on a rocking lever device and the couching roll is mounted on a two-armed lever device, the said two-armed lever device and the said rocking lever device being connected together and a control rod for effecting movement of the second arm of the two-armed lever device. By operating this control rod it is possible to actuate the means for moving the couching roll and the felt-supporting roller in one switching operation and thus to lift the couching roll and also with the aid of the felt-supporting roller the take-up felt from the cylinder mould without any interruption of production.

A further feature of the invention consists of the cylinder mould being mounted in an end plate arranged at the side of the machine on which the operator is positioned, said end plate consisting of a plurality of elements and means mounted adjacent the end plate being provided for relieving the weight on one of said elements so as to permit its removal.

Thus after removal of the element, an aperture is obtained through which means for removing and reintroducing the cylinder mould can be introduced into the cylinder vat.

The preferred embodiment of invention provides a guide-rail frame which can be pushed into the apparatus, is adapted to the shape of the cylinder vat, and upon which a lifting truck provided with rollers is movably arranged. The said lifting truck may have a platform which can be vertically adjusted via worm gearing and worm-gear spindles, and also projections which can be pivoted from the operator's position and are arranged on the driving and operator's side.

The preferred embodiment of the invention may also provide a chassis which can be connected to the guide-rail frame, forming together therewith an extended track for the lifting truck, the said chassis being provided with drive means for removing and introducing the cylinder mould.

In a further feature of the invention the said drive means comprises, for example, a cable drum actuated by hand cranks via an intermediate gear, cable lines the ends of which are secured on the lifting truck being laid round the said cable drum. The said chassis may also be provided with a retaining means which can be connected to the floor to secure the position of said chassis.

In consequence of this arrangement, a cylinder mould, which can also be constructed as a suction sifting drum carried by the platform of the lifting truck and maintained in its position by projections can be laterally moved out, with the aid of the lifting truck, on the guide-rail frame and subsequently on the chassis, being re-introduced after the necessary work has been performed on it.

The invention is illustrated, merely by way of example, in the accompanying drawings wherein:

FIGURE 6 is a plan view of a chassis;

FIGURE 7 is a cross-section through the retaining means of the chassis;

FIGURE 8 is a view of the roller arrangement of the chassis; and

FIGURE 9 is a plan view of the lifting truck shown in section in FIGURE 5.

Figures 1, 2:
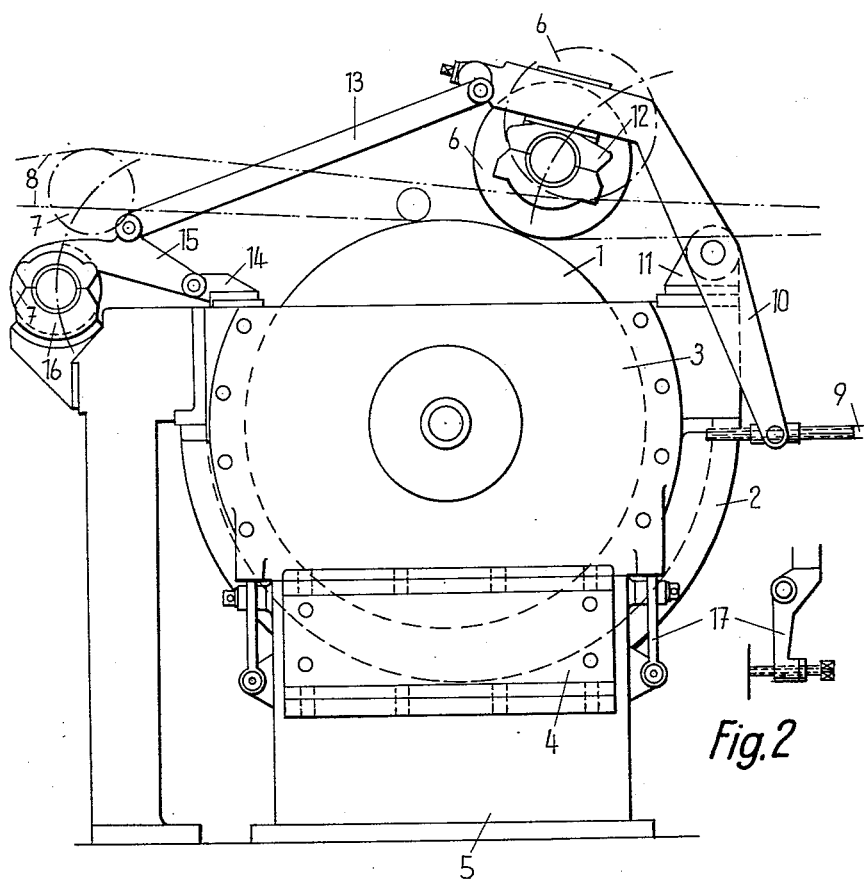
FIGURE 1 shows an apparatus according to the invention, seen from the operator's position.
FIGURE 2 shows a detail of FIGURE 1—i.e. it is a view of a cam lever.
Figure 3:
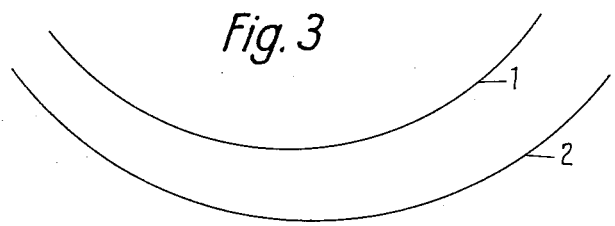
FIGURE 3 is a diagrammatic illustration of the lower part of the cylinder mould of said apparatus and of the cylinder vat.

FIGURE 1 shows a cylinder mould 1 mounted in a cylinder vat 2 which is bounded on the operator's side by an end plate 3 consisting of a plurality of parts including an element 4. The element 4 bears on a base portion 5 and is screwed fast thereto and to the end plate 3. A take-up felt 8 guided over the cylinder mould 1 is acted upon by a couching roll 6 pivotally arranged with its bearings 12 on the two-armed levers 10. The double-armed levers 10 pivot about the bearing 11. A control rod 9 is articulated to at least one of the two-armed levers 10. Guide rods 13 connect the two-armed levers with rocking levers 15 upon which the bearings 16 of a felt-support roller 7 are arranged. The rocking levers 15 pivot about bearings 14.

In the case of a movement of the lever structure comprising the members 10, 13, 15 effected through the control rod 9, the couching roll 6 is lifted from the cylinder mould 1 and, after the felt supporting roller 7 has come into contact during its travel with the take-up felt 8, the latter is also lifted from the cylinder mould. Subsequently, the element 4 is relieved of the weight which it supports by supporting the end plate 3 with the aid of the cam lever 17. The element 4 is then removed.

Figure 4:
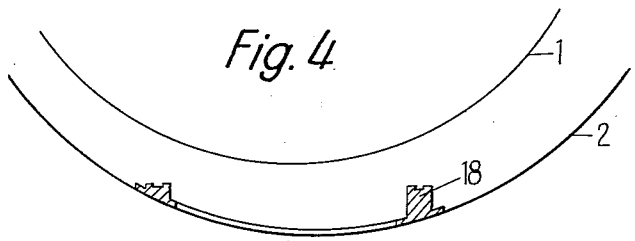
FIGURE 4 shows the lower part illustrated in FIGURE 3, but with an inserted guide-rail frame, shown in section.
Figure 5:
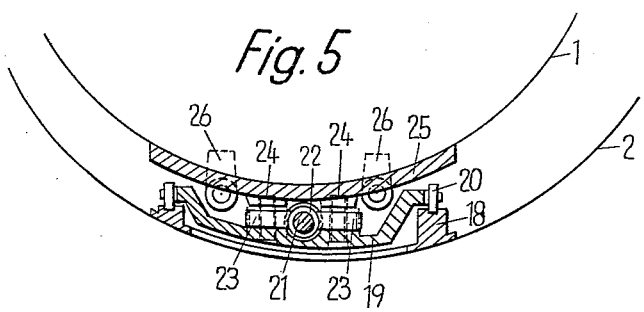
FIGURE 5 shows the part according to FIGURE 4, with a pushed-in lifting truck, in section.

It is now possible to introduce into the cylinder vat 2, through the aperture thus obtained (cf. FIGURE 4), a guide-rail frame 18 upon and along which, as is apparent from FIGURE 5, a lifting truck 19 with rollers 20 can be moved. The lifting truck 17 carries a platform 25 which is adapted to be vertically adjusted with the aid of a hand crank 46 (cf. FIGURE 9) by means of the worm-drive shaft 21 via the worm 22, the worm-wheels 23, and the worm-gear spindles 24. For preventing the cylinder mould 1 from sliding off the platform 25 when being carried thereon, there are provided projections 26 which can be placed in and out of position from the operator's side of the machine. The gearing elements of the lifting truck 19 are positioned on the driving and operator's side and positioned in traverses 27 (shown diagrammatically in FIGURE 6).

A chassis 28 provided with rollers 30 (cf. FIGURE 8) and constructed as a rigid unit with the aid of struts, 29, 31, 32, 33, is adapted to be moved up to the guide-rail frame 18 and connected thereto. Thus, the said chassis and the said guide-rail frame, together form a track extending outwards from the machine for the lifting truck 19. A retaining means 34, 35 provided on the floor serves to secure the chassis 28. Arranged in the chassis 28 is a cable drum 40 driven by hand cranks 43 via an intermediate gear 41, 42, cable lines 36, 37 which are disposed round the cable drum and the ends of which are secured on the traverse 27 of the lifting truck 19. The end of the cable line 36 is passed round a cable pulley 38 secured rigidly in position with the aid of bolts 39. The cable line 37 is passed round a cable pulley 44 arranged in the bearing 45.

Thus, when the cranks 43 are rotated, the cylinder mould 1 positioned on the lifting truck 19 can, by means of the cable lines 36, 37, be easily moved out clear of the cylinder vat for the purpose of carrying out any work which may be necessary and when the necessary work has been completed the cylinder mould can then be replaced in position by use of the lifting truck 19. This process of removing or replacing the cylinder mould may be effected if necessary, without stopping the operation of the paper making machine.

We claim:

In a method for axially displacing a cylinder mould in a cylinder vat, the steps of relieving the force exerted on at least one part of an end plate of said cylinder mould, thereafter disconnecting and removing said one part of said end plate of said cylinder mould, then lifting said cylinder mould from inside of said vat while introducing transporting means between said cylinder mould and said vat, moving said cylinder mould with respect to said vat with the aid of said transporting means.

References Cited in the file of this patent

UNITED STATES PATENTS

| | | |
|---|---|---|
| 12,027 | Marland | Dec. 5, 1854 |
| 12,028 | Marland | Dec. 5, 1854 |
| 402,174 | Mackall | Apr. 30, 1889 |
| 1,730,281 | McCarter | Oct. 1, 1929 |
| 1,869,789 | Williams | Aug. 2, 1932 |
| 2,290,087 | Berry et al. | July 14, 1942 |
| 2,367,778 | Hornbostel | Jan. 23, 1945 |
| 2,535,732 | Goodwillie | Dec. 26, 1950 |
| 2,694,346 | Goodwillie | Nov. 16, 1954 |
| 2,753,766 | Simpson | July 10, 1956 |

FOREIGN PATENTS

| | | |
|---|---|---|
| 196,138 | Germany | Mar. 6, 1908 |
| 471,076 | France | Oct. 13, 1914 |